L. A. PETERSON.
CHANGE SPEED LEVER.
APPLICATION FILED OCT. 18, 1916.
1,248,907.
Patented Dec. 4, 1917.
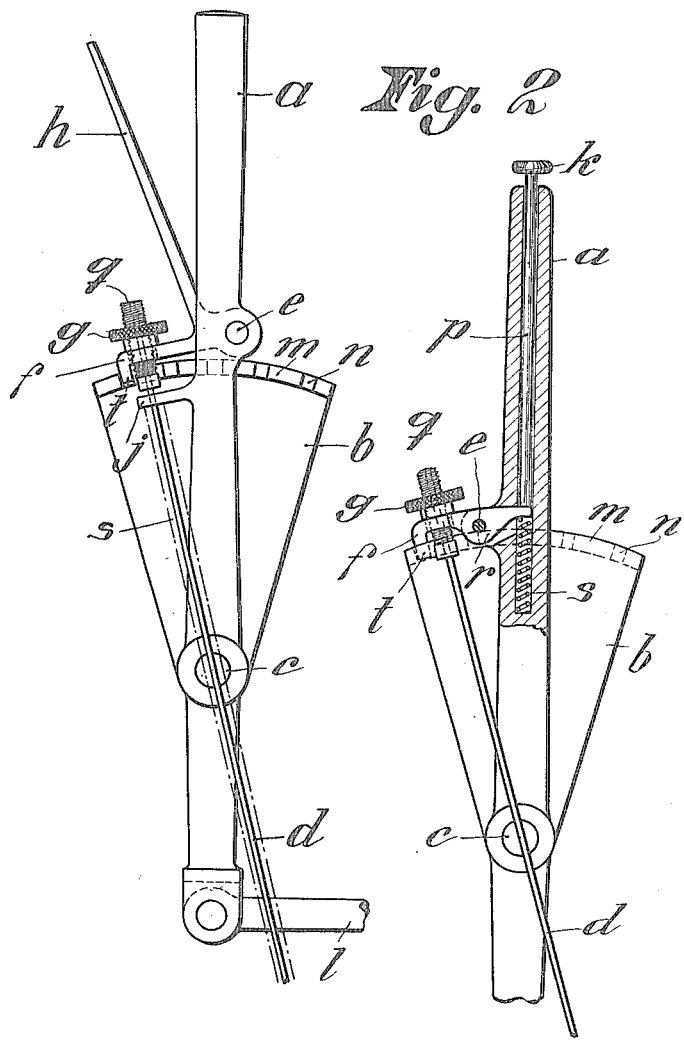

UNITED STATES PATENT OFFICE.

LARS AUGUST PETERSON, OF STOCKHOLM, SWEDEN.

CHANGE-SPEED LEVER.

1,248,907.    Specification of Letters Patent.    Patented Dec. 4, 1917.

Application filed October 18, 1916. Serial No. 126,326.

*To all whom it may concern:*

Be it known that I, LARS AUGUST PETERSON, a subject of the King of Sweden, residing at Stockholm, in the Kingdom of Sweden, have invented a new and useful Change-Speed Lever, of which the following is a specification.

The invention relates to the hand lever by means of which the speed changing device used in automobiles and for other purposes is operated or controlled.

It is well known that before operating said lever, the pressure, which the motor power exerts on the change speed gearing should preferably be diminished or ceased, either by disengaging the clutch or by retarding the ignition or by throttling the gas supply or by decreasing or stopping the suction of fuel or by making two or more or all of these operations, so as to facilitate the changing of speed.

The present invention has for its object to connect the means for said operation or operations to said lever in such a manner that said operation or operations will take place previously to and not simultaneously with the shift of the lever.

For this purpose said means are not connected direct to the change speed lever but to a second lever or the like which is mounted on the change speed lever and acts as a pawl or the like for locking the same in position so that the change speed lever can not be moved unless the second lever is first moved. This second lever is preferably so arranged that it can be operated by the same hand which operates the change speed lever and simultaneously with the grasping of the latter.

On the annexed schematic drawing, which shows two examples,

Figure 1 is side view and

Fig. 2 partial vertical section of a change speed lever connected with a secondary locking lever for the purpose above stated.

*a* is the change speed lever which is pivoted at *c* and connected to the change speed gearing by suitable means, in Fig. 1 represented by a link *l*.

The second lever consists in Fig. 1 of an angular lever *h* pivoted on the lever *a* at *e* and having on its lower arm *f* a tooth *t* adapted to engage holes or notches *n* on a fixed bow *m* concentric with the pivot *c*. This bow is represented as a rim or flange on a fixed sector *b*.

The means for connecting said lever *h* to the device which should be operated is represented by a wire *d*. To the upper end of said wire is fixed a screw *q* which enters a hole in the lower arm *f* and has a nut *g* above said arm, so that the length or tension of wire *d* or of a spring *s* passed on the wire and resting against a lug *j* on lever *a* can be adjusted by said nut. Or the wire can be fixed direct to arm *f*, if preferred.

The tooth *t* keeps the lever *a* in position.

When the speed should be changed, the operator grasps the upper end of lever *a* and lever *h* and presses them together so that the tooth *t* will be released from the notch. Then the lever *a* is free and can be swung to the desired position and locked in this position by slacking the grip, so that tooth *t* can enter the corresponding notch *n*.

When the lever *h* is pressed against lever *a* as stated, the wire is pulled by the upward movement of arm *f* and the device connected to said wire is operated. It is obvious that said operation takes place during the upward movement of tooth *t* in notch *n*, that is to say before the lever *a* is free to move.

In Fig. 2 the lever *h* is substituted by a lever *r* pivoted on lever *a* at *e* and having a tooth *t* at one end adapted to engage the notches *n* in bow *m*. The other end of lever *r* enters a slot in lever *a* so as to be operated by a pin *p* loosely mounted in a longitudinal bore in upper part of lever *a*. A spring *s* placed in the lower portion of said bore, beneath lever *r* tends to keep tooth *t* engaged in the notches *n*.

When grasping the upper portion of lever *a* and pressing down the knob *k* on pin *p* the lever *r* is swung so as to release tooth *t* from the notch *n* and thus make lever *a* free to be moved.

I claim:

A change speed apparatus for automobile vehicles comprising in combination a change speed lever, means for locking said lever in any desired position, and means for connecting said locking means with a control part of the engine, said locking means and connecting means being so arranged that the control parts will be operated before the change speed lever is free to move.

LARS AUGUST PETERSON.

Witnesses:
R. AMILON,
L. HUDERSON.